US006859621B2

United States Patent
Ueyama

(10) Patent No.: US 6,859,621 B2
(45) Date of Patent: Feb. 22, 2005

(54) CAMERA, CONTROL METHOD THEREFOR, RECORDING MEDIUM, AND PROGRAM

(75) Inventor: Teruhiko Ueyama, Kanagawa (JP)

(73) Assignee: Canon Kabushiki Kaisha (JP)

( * ) Notice: Subject to any disclaimer, the term of this patent is extended or adjusted under 35 U.S.C. 154(b) by 18 days.

(21) Appl. No.: 10/388,311

(22) Filed: Mar. 13, 2003

(65) Prior Publication Data

US 2003/0175022 A1 Sep. 18, 2003

(30) Foreign Application Priority Data

Mar. 15, 2002 (JP) ........................................ 2002-072917

(51) Int. Cl.[7] ............................ G03B 7/08; H04B 5/235
(52) U.S. Cl. ...................................... 396/213; 348/362
(58) Field of Search ................................. 396/213, 226;
348/229.1, 230.1, 362–366

(56) References Cited

U.S. PATENT DOCUMENTS

| 3,852,777 A | * | 12/1974 | Lieser et al. ................ 396/207 |
| 4,359,273 A | * | 11/1982 | Aihara et al. ................ 396/226 |
| 4,825,293 A | | 4/1989 | Kobayashi et al. ....... 348/229.1 |
| 4,969,045 A | | 11/1990 | Haruki et al. ............ 348/229.1 |
| 5,532,785 A | * | 7/1996 | Goto et al. .................. 396/246 |

* cited by examiner

Primary Examiner—W. B. Perkey
(74) Attorney, Agent, or Firm—Morgan & Finnegan, LLP

(57) ABSTRACT

An object of this invention is to realize high-precision exposure control while maintaining a short time lag until actual exposure processing is executed after an operation input for the start of image sensing processing. To achieve this object, an exposure control value for executing proper exposure control is calculated by an exposure calculation unit upon reception of an image sensing processing preparation start instruction. Exposure is controlled on the basis of the exposure control value calculated by the exposure calculation unit, and an image is sensed. Whether the exposure calculation unit calculates an exposure control value before an image sensing processing start instruction is received upon reception of the image sensing processing preparation start instruction is determined. If no exposure control value is determined to have been calculated, the luminance level of image information of the image is corrected.

17 Claims, 5 Drawing Sheets

US 6,859,621 B2

CAMERA, CONTROL METHOD THEREFOR, RECORDING MEDIUM, AND PROGRAM

FIELD OF THE INVENTION

The present invention relates to a camera which realizes high-precision exposure control while maintaining a short time lag until actual exposure processing is executed after an operation input for the start of actual exposure preparation processing, a control method therefore, a recording medium, and a program.

BACKGROUND OF THE INVENTION

Conventional image processing apparatuses such as an electronic camera which uses a memory card having a solid-state memory element as a recording medium, and records and plays back still and moving images require a higher exposure precision because the latitude of a solid-state image sensing element is much narrower than that of a film for a silver halide camera. To determine an accurate exposure value, the image processing apparatus performs very complicated calculation processing and requires a higher-precision stop and mechanical shutter than those of a silver halide camera.

This results in a long release time lag. The time lag is generally eliminated by performing photometry and high-precision exposure calculation when SW1 is pressed, and starting actual exposure immediately after SW2 is pressed. In practice, most photographers press the shutter switch by one stroke without any consciousness of SW1 and SW2. The photographer, therefore, feels that such a camera has a long time lag.

To shorten the time lag generated in photographing by pressing the shutter switch by one stroke, there has been provided a method of increasing the speed by decreasing the calculation count of an automatic exposure control means that is one of main factors contributing to the time lag.

When, however, the photographer presses the shutter switch by one stroke without any consciousness of SW1 and SW2, high-precision exposure control cannot be achieved by the method of increasing the speed by decreasing the calculation count of the automatic exposure control means.

SUMMARY OF THE INVENTION

The present invention has been made to overcome the conventional drawbacks, and has as its object to provide a camera capable of acquiring image information at a proper exposure level even upon an operation in which the time interval between press of SW1 and press of SW2 is shorter than an exposure control value calculation time, a control method for the camera, a recording medium, and a program.

To solve the above-described problems and achieve the above object, according to the first aspect of the present invention, an apparatus comprises: (A) a first operation unit which designates preparation of photographing; (B) a second operation unit which designates start of photographing; and (C) a photographing unit which starts exposure preparation operation in response to operation of the first operation unit and starts exposure operation in response to operation of the second operation unit, wherein the photographing unit corrects an exposure result after exposure operation when start of exposure operation is designated by operation of the second operation unit before completion of the exposure preparation operation.

According to the second aspect of the present invention, a photographing method comprises: starting exposure control preparation operation in response to operation of a first operation unit, starting exposure operation in response to operation of a second operation unit, and when start of exposure operation is designated by operation of the second operation unit before completion of the exposure control preparation operation, correcting an exposure result after exposure operation.

According to the third aspect of the present invention, a photographing control computer program comprises: starting exposure control preparation operation in response to operation of a first operation unit, starting exposure operation in response to operation of a second operation unit, and when start of exposure operation is designated by operation of the second operation unit before completion of the exposure control preparation operation, correcting an exposure result after exposure operation.

According to the fourth aspect of the present invention, a storage medium stores the above-described photographing control computer program.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail below with reference to the accompanying drawings.

Figure 1:
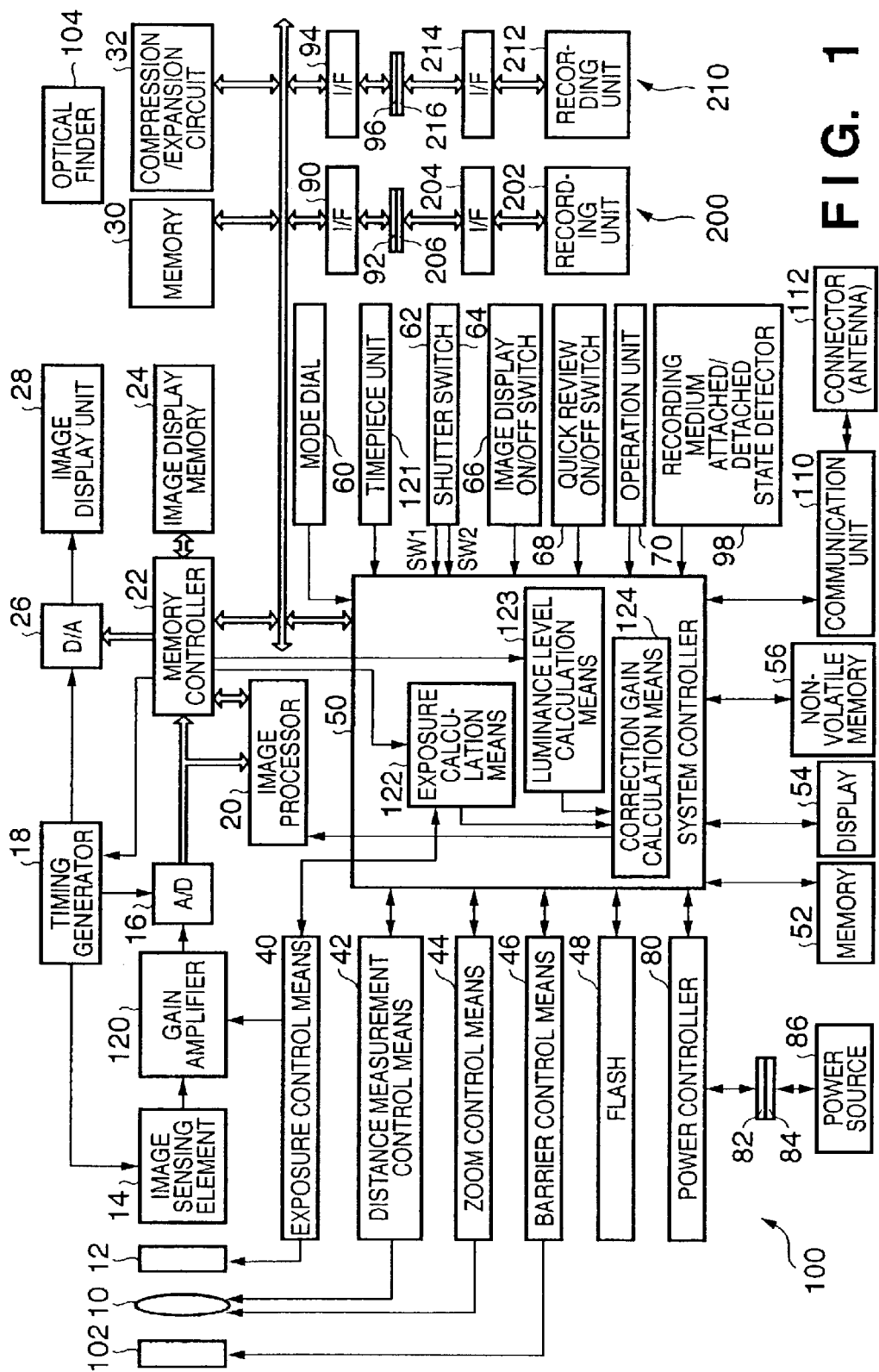
FIG. 1 is a block diagram showing the schematic arrangement of an image processing apparatus according to the first to fifth embodiments of the present invention.

FIG. 1 is a block diagram showing the schematic arrangement of an image processing apparatus according to the first to fifth embodiments of the present invention. In FIG. 1, reference numeral 100 denotes an image processing apparatus; 10, a photographing lens; 12, a shutter having a stop function; 14, an image sensing element which converts an optical image into an electrical signal; 120, a gain amplifier which amplifies an analog signal output from the image sensing element 14 and sets the camera sensitivity; and 16, an A/D converter which converts an analog signal output from the image sensing element 14 into a digital signal.

Reference numeral 18 denotes a timing generator which supplies a clock signal and control signal to the image sensing element 14, the A/D converter 16, and a D/A converter 26 under the control of a memory controller 22 and system controller 50; and 20, an image processor which performs predetermined pixel interpolation processing and color conversion processing on data from the A/D converter 16 or data from the memory controller 22. The image processor 20 also performs predetermined calculation processing using sensed image data. The system controller 50 performs TTL (Through-The-Lens) AF (Auto Focus) processing, AE (Auto Exposure) processing, and EF (pre-flash) processing with respect to an exposure control means 40 and distance measurement control means 42 on the basis of the obtained calculation result.

Further, the image processor 20 performs predetermined calculation processing using sensed image data, and performs TTL AWB (Auto White Balance) processing on the basis of the calculation result.

The memory controller 22 controls the A/D converter 16, the timing generator 18, the image processor 20, an image display memory 24, the D/A converter 26, a memory 30, and a compression/expansion circuit 32. Data from the A/D converter 16 is written into the image display memory 24 or memory 30 via the image processor 20 and memory controller 22, or directly via the memory controller 22.

The system controller 50 comprises an exposure control means 122, luminance level calculation means 123, and correction gain calculation means 124. The exposure control means 122 calculates a proper exposure value on the basis of a luminance level measured by the TTL method via the memory controller 22, and controls the exposure control means 40. The luminance level calculation means 123 calculates a luminance level from image data sensed via the memory controller 22. The correction gain calculation means 124 compares the luminance level measured by the exposure control means 122 and the calculated luminance level, and calculates a correction value so as to achieve a proper level. The image data undergoes digital gain correction by the image processor 20.

Reference numeral 24 denotes the image display memory; 26, the D/A converter; and 28, an image display unit comprised of a TFT LCD or the like. Display image data written in the image display memory 24 is displayed on the image display unit 28 via the D/A converter 26. An electronic finder function can be realized by sequentially displaying sensed image data on the image display unit 28.

The image display unit 28 arbitrarily turns on/off its display in accordance with an instruction from the system controller 50. If the display is turned off, the electric consumption of the image processing apparatus 100 can be greatly reduced. The memory 30, used for storing photographed still and moving images, has a sufficient storage capacity for storing a predetermined number of still images and a moving image for a predetermined period. In sequential shooting to sequentially shoot a plurality of still images or in panoramic photographing, a large number of images can be written into the memory 30 at a high speed. The memory 30 can be used as a work area for the system controller 50.

The compression/expansion circuit 32 compresses or expands image data by adaptive discrete cosine transformation (ADCT) or the like. The compression/expansion circuit 32 reads out an image stored in the memory 30, performs compression or expansion processing on the read image, and writes the processed data into the memory 30. The exposure control means 40 controls the shutter 12 having a stop function, and also has a flash dimming function in cooperation with a flash 48.

The distance measurement control means 42 controls focusing of the photographing lens 10. Reference numeral 44 denotes a zoom control means which controls zooming of the photographing lens 10; and 46, a barrier control means which controls the operation of a protection means 102 serving as a barrier. The flash 48 has an AF auxiliary light projection function and flash adjusting function.

The exposure control means 40 and distance measurement control means 42 are controlled by the TTL method. The system controller 50 controls the exposure control means 40 and distance measurement control means 42 on the basis of the calculation result of calculating sensed image data by the image processor 20. The system controller 50 controls the overall image processing apparatus 100. Reference numeral 52 denotes a memory which stores constants, variables, programs, and the like for operating the system controller 50.

Reference numeral 54 denotes a display unit including a liquid crystal display device and loudspeaker which display and output operating statuses, messages, and the like by using characters, images, sound, and the like in accordance with execution of a program by the system controller 50. One or a plurality of display units 54 are arranged at easy-to-see positions near the operation unit of the image processing apparatus 100. Each display unit 54 includes a combination of an LCD, LED, sound generating element, and the like. Some functions of the display unit 54 are provided within an optical finder 104.

The display contents of the display unit 54, displayed on the LCD or the like, include indication of single-shot/sequential shooting, a self timer, a compression ratio, the number of recording pixels, the number of recorded images, the number of recordable images, a shutter speed, an f-number, exposure compensation, flash illumination, pink-eye effect mitigation, macro photographing, a buzzer-set state, a remaining timer battery level, a remaining battery level, an error state, information of plural digit numbers, the attached/detached status of recording media 200 and 210, the operation of a communication I/F, and date and time.

The display contents of the display unit 54, displayed within the optical finder 104, include a focus state, a camera shake warning, a flash charge state, a shutter speed, an f-number, and exposure compensation. Reference numeral 56 denotes an electrically erasable and recordable nonvolatile memory such as an EEPROM.

Reference numerals 62, 64, 66, 68, and 70 denote operation means used to input various operation instructions to the system controller 50. These operation means 62, 64, 66, 68, and 70 comprise one or a plurality of combinations of switches, dials, touch panels, a device for pointing by line-of-sight detection, a voice recognition device, and the like. These operation means will be described in detail.

The shutter switch SW1 62 is turned on by half stroke of a shutter switch (not shown) to designate the start of the operations of AF (Auto Focus) processing, AE (Auto Exposure) processing, AWB (Auto White Balance) processing, and EF (pre-flash) processing. The shutter switch SW2 64 is turned on by full stroke of the shutter switch (not shown) to designate the start of a series of processing operations: exposure processing to write a signal read from the image sensing element 14 into the memory 30 via the A/D converter 16 and memory controller 22; development processing by using calculations by the image processor 20 and memory controller 22; and recording processing to read out image data from the memory 30, compress the image data by the compression/expansion circuit 32, and write the image data into the recording medium 200 or 210.

The image display ON/OFF switch 66 can set the ON/OFF state of the image display unit 28. This function can stop the supply of a current to the image display unit including a TFT LCD or the like in photographing using the optical finder 104, thereby saving power.

The quick review ON/OFF switch 68 sets a quick review function of automatically reproducing photographed image data immediately after photographing. In the embodiments, the quick review ON/OFF switch 68 has a function of setting the quick review function when the image display unit 28 is OFF.

Reference numeral 121 denotes a timepiece unit which can measure the time until the shutter switch 64 is pressed after the shutter switch 62 is pressed.

The operation unit 70 comprises various buttons and touch panels including a menu button, a set button, a macro button, a multi-image reproduction/repaging button, a flash set button, a single-shot/sequential shooting/self-timer switching button, a forward (+) menu item selection button, a backward (−) menu item selection button, a forward (+) reproduction image search button, a backward (−) reproduction image search button, a photographing quality selection button, an exposure correction button, and a date/time set button.

Reference numeral 80 denotes a power control means which comprises a battery detection circuit, a DC/DC converter, a switch circuit to switch a block to be energized, and the like. The power control means 80 detects the attached/detached state of the battery, a battery type, and a remaining battery power level. The power control means 80 controls the DC/DC converter based on detection results and an instruction from the system controller 50, and supplies a necessary voltage to respective parts including a recording medium for a necessary period.

Reference numerals 82 and 84 denote connectors; and 86, a power source means including a primary battery such as an alkaline battery or lithium battery, a secondary battery such as an NiCd battery, NiMH battery, or Li battery, an AC adaptor, and the like.

Reference numerals 90 and 94 denote interfaces for recording media such as a memory card and hard disk; 92 and 96, connectors which connect the image processing apparatus 100 and recording media such as a memory card and hard disk; and 98, a recording medium attached/detached state detection means which detects whether the recording medium 200 or 210 is attached to the connector 92 or 96.

In the embodiments, two systems of interfaces and connectors for connection with recording medium are employed. However, one or a plurality of systems of interfaces and connectors for connection with recording medium may be provided. Further, interfaces and connectors pursuant to different standards may be combined. As the interfaces and connectors, cards in conformity with PCMCIA card standards and cards in conformity with CF (Compact Flash®) card standards may be used.

In a case where cards and connectors in conformity with the PCMCIA standards, CF (Compact Flash®) card standards, and the like are used as the interfaces 90 and 94 and the connectors 92 and 96, image data and management information attached to the image data can be transferred between the image processing apparatus and other peripheral devices such as a computer and printer by connecting various communication cards such as a LAN card, modem card, USB card, IEEE 1394 card, P1284 card, SCSI card, and PHS card.

The protection means 102 is a barrier which prevents contamination and damage of an image sensing portion by covering the image sensing portion including the lens 10 of the image processing apparatus 100. The optical finder 104 allows photographing an image by using only the optical finder without the use of any electronic finder function on the image display unit 28. The optical finder 104 displays some functions of the display unit 54 such as a focus state, a camera shake warning, a flash charge state, a shutter speed, an f-number, and exposure compensation.

Reference numeral 110 denotes a communication means having various communication functions for RS232C, USB, IEEE 1394, P1284, SCSI, modem, LAN, and wireless communication; and 112, a connector/antenna which functions as a connector when the image processing apparatus 100 is connected to another device via the communication means 110, and as an antenna for wireless communication. The recording medium 200 comprises a memory card, hard disk, or the like.

The recording medium 200 has a recording unit 202 of a semiconductor memory, magnetic disk, or the like, an interface 204 for the image processing apparatus 100, and a connector 206 for connection with the image processing apparatus 100. Also, the recording medium 210 comprises a memory card, hard disk, or the like. The recording medium 210 has a recording unit 212 of a semiconductor memory, magnetic disk, or the like, an interface 214 for the image processing apparatus 100, and a connector 216 for connection with the image processing apparatus 100.

(First Embodiment)

Figure 2:
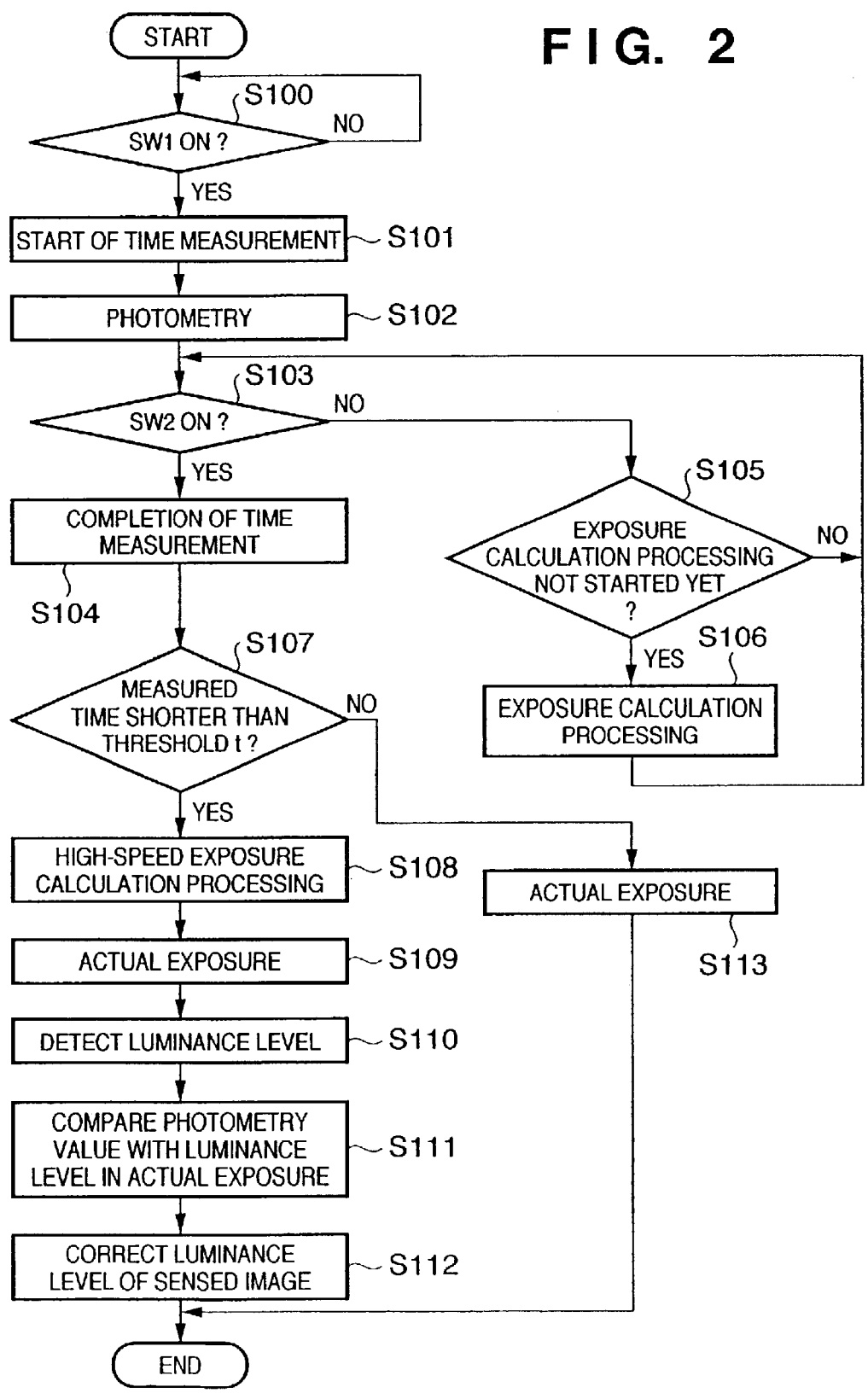
FIG. 2 is a flow chart showing the operation flow of an image processing apparatus according to the first embodiment.

The operation of the first embodiment will be described with reference to FIG. 2. FIG. 2 is a flow chart showing the main routine of an image processing apparatus 100 according to the first embodiment. The operation of the image processing apparatus 100 will be explained with reference to FIG. 2.

If a shutter switch SW1 62 is pressed (Y in S100), a timepiece unit 121 starts measuring the time (S101), and an exposure calculation means 122 receives the luminance level of a photometry value (S102). If a shutter switch SW2 64 is pressed (Y in S103), the timepiece unit 121 ends time measurement (S104), and then measures the time until the shutter switch SW2 64 is pressed after the shutter switch SW1 62 is pressed.

If the shutter switch SW2 64 is not pressed (N in S103), and exposure calculation processing has not started yet (Y in S105), exposure calculation processing is done by the exposure calculation means 122 (S106). If exposure calculation processing has already started (N in S105), no processing is done until the shutter switch 64 is pressed. After the shutter switch 64 is pressed, the timepiece unit 121 ends time measurement (S104), and then measures the time until the shutter switch SW2 64 is pressed after the shutter switch SW1 62 is pressed.

At this time, exposure calculation processing is interrupted immediately when the shutter switch 64 is pressed before the end of exposure calculation processing. The timepiece unit 121 measures the time until the shutter switch SW2 64 is pressed after the shutter switch SW1 62 is pressed (S104). If the measured time is longer than a given threshold t (N in S107), it is determined that an exposure control value has already been calculated when SW2 is pressed after SW1 is pressed. An exposure control means 40 controls exposure on the basis of the result of exposure calculation processing (S106), and image sensing processing ends after actual exposure (S113). If the measured time is shorter than the threshold t (Y in S107), it is determined that no exposure control value has been calculated yet when SW2 is pressed after SW1 is pressed. Simple, high-speed exposure calculation processing (S108) which ends within a short time even at a low precision is performed, and then actual exposure is executed (S113).

After actual exposure, a luminance level calculation means 123 detects the luminance level of the sensed image (S110). A proper luminance level Y in photometry and a luminance level Y1 of an image in actual exposure are compared to calculate a correction gain α (S111):

$$\alpha = Y/Y1 \qquad (1)$$

Each pixel value of the image in actual exposure is multiplied by the correction gain α obtained as a result of comparison, correcting the luminance level (S112). At this time, the luminance level Y of the photometry value and the luminance level Y1 of the image in actual exposure are compared by using values calculated under the same conditions. The luminance level at this time may be the average luminance level of the entire screen, the luminance level of only the central portion, or the average luminance of the luminance levels of divided areas.

After a series of processes end, processed image data is written in a memory 30. The image data written in the memory 30 is read out and subjected to image compression processing corresponding to a set mode by a compression/expansion circuit 32. The compressed image data is written into a recording medium 200 or 210 such as a memory card or compact flash® card via an interface 90 or 94 and a connector 92 or 96. After write in the recording medium, the image sensing processing routine ends.

(Second Embodiment)

Figure 3:
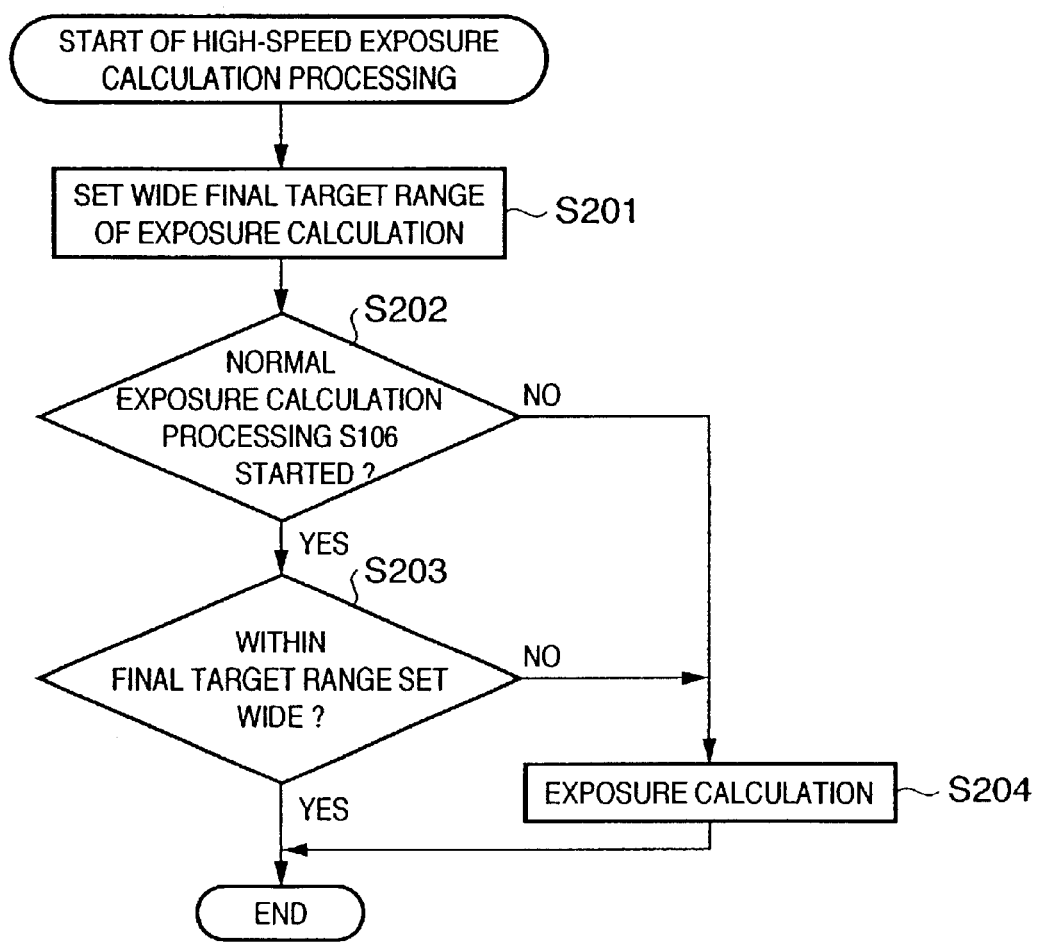
FIG. 3 is a flow chart showing the operation flow of an image processing apparatus according to the second embodiment.

In the second embodiment, the final target range of exposure calculation, i.e., the latitude of a calculated exposure control value is widened in S201 as shown in FIG. 3 for the purpose of higher-speed exposure calculation processing in place of high-speed exposure calculation processing (S108). Whether exposure calculation processing (S106) in FIG. 2 has been executed is determined (S202). If S106 has not been executed, exposure calculation processing (S204) is performed.

If S106 has been executed and the calculation result in S106 falls within the final target range set in S201 (Y in S203), the processing result is used. If the calculation result in S106 falls outside the final target range (N in S203), exposure calculation processing (S204) is performed. With this processing, the calculation processing count may be decreased, achieving high-speed exposure calculation processing.

(Third Embodiment)

In the second embodiment, the final target range of exposure calculation is widened for high-speed exposure calculation processing. The target range is also widened to an overexposure direction. In luminance level correction for an overexposed image, many portions are saturated, resulting in a narrow-latitude image.

Figure 4:
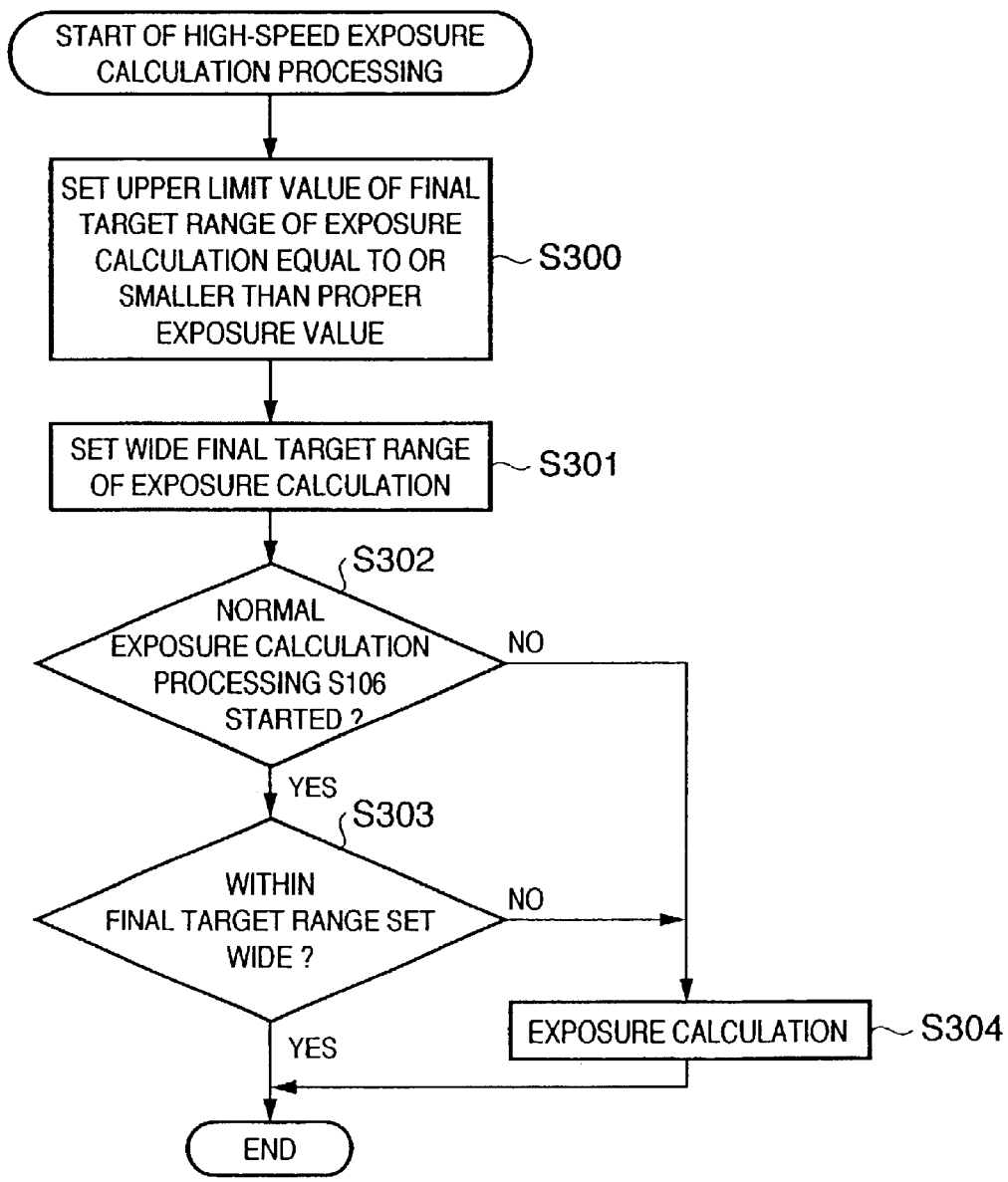
FIG. 4 is a flow chart showing the operation flow of an image processing apparatus according to the third embodiment.

To prevent this, the upper limit value of the final target range of exposure calculation is set equal to or smaller than, e.g., a proper exposure value (S300), as shown in FIG. 4. Thereafter, similar to the second embodiment, the final target range is set wider for high-speed exposure calculation (S301). The exposure control value may be calculated in this way, achieving high-speed exposure calculation processing capable of correcting an image having a wide latitude for subsequent processing and a large information amount of high-luminance portion.

(Fourth Embodiment)

In the first to third embodiments, the image sensing processing method is selected in accordance with the time until the shutter switch SW2 is pressed after the shutter switch SW1 is pressed. When the photographer sets before photographing an exposure parameter (f-number, shutter speed, sensitivity, or the like) serving as a set value concerning exposure control value calculation processing, image sensing processing of performing a series of luminance correction processes described above may be inhibited.

(Fifth Embodiment)

Figure 5:
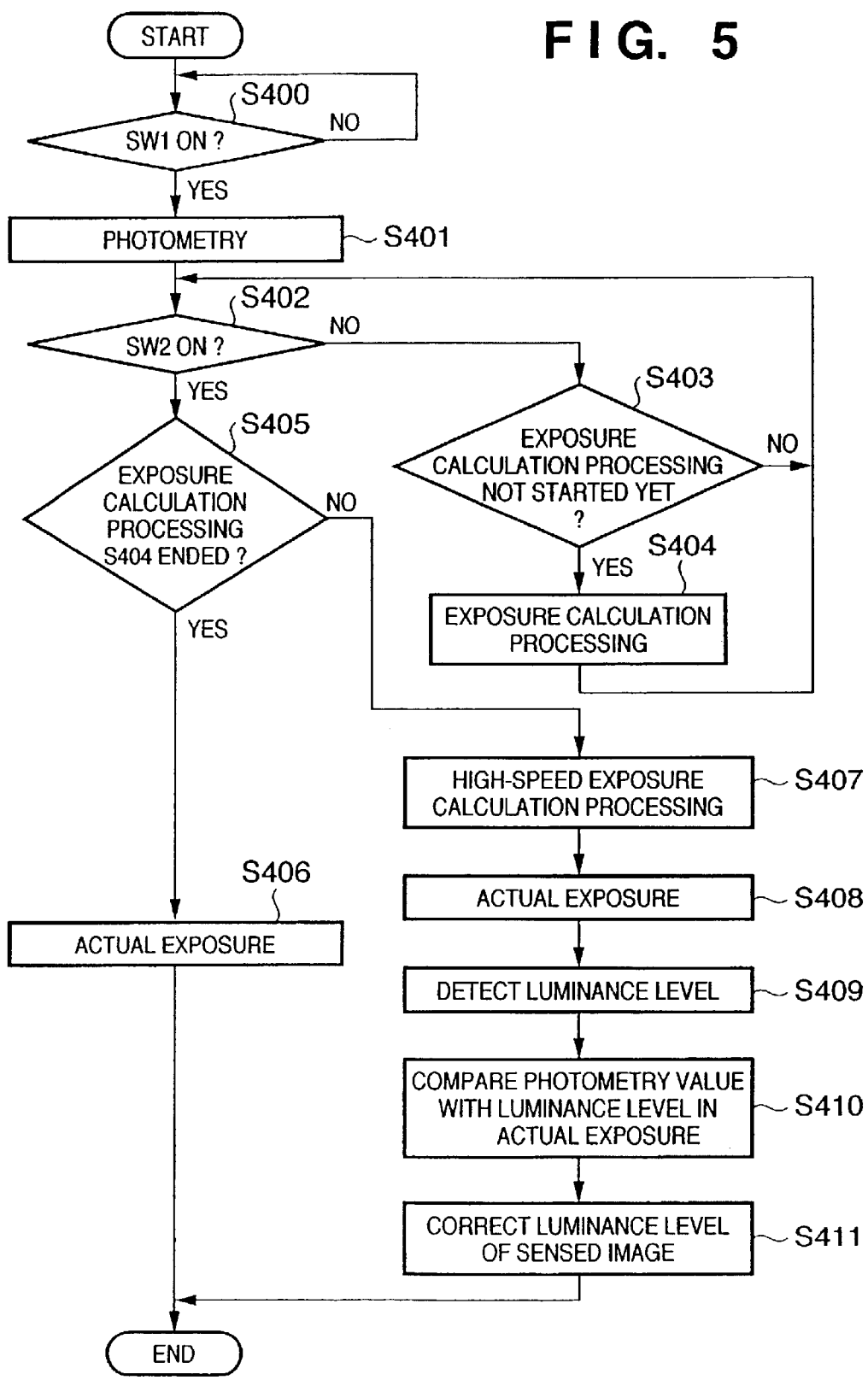
FIG. 5 is a flow chart showing the operation flow of an image processing apparatus according to the fifth embodiment.

In the above embodiments, image sensing processing is selected by measuring the time until the shutter switch SW2 is pressed after the shutter switch SW1 is pressed, and comparing the measured time with the threshold t. Alternatively, image sensing processing may be selected by determining (step S405) whether exposure calculation processing ends before SW2 is pressed (S402) after SW1 is pressed (S400), as shown in FIG. 5.

The embodiments of the present invention have been described with reference to FIGS. 1 to 5. In the description of the embodiments, the photographing mode is an autoexposure mode. The autoexposure mode is generally an automatic setting mode corresponding to an object to be photographed, such as a landscape mode, a portrait mode, a night view mode, a close-up photographing mode, a pan focus mode, a color effect mode, or a moving picture mode. In the description of the fourth embodiment, the photographing mode in which the photographer sets an exposure parameter is generally a photographing mode called a manual mode, an aperture priority mode, a shutter priority mode, or a program shift mode.

In the description of the third embodiment, the upper limit value of the final target range of exposure calculation is set equal to or smaller than a proper exposure value (S300). Alternatively, the upper limit value of the final target range of exposure calculation may be set equal to an upper limit value used before the target range is widened, thereby widening the final target range to an underexposure side.

Exposure calculation processing is interrupted immediately when the shutter switch 64 is pressed before the end of exposure calculation processing, and the timepiece unit 121 measures the time until the shutter switch 64 is pressed after the shutter switch 62 is pressed (S104). If the measured time is equal to or longer than the threshold t, processing may continue until an exposure control value is obtained without interrupting exposure calculation processing.

The recording media 200 and 210 may also be composite media of memory cards, hard disks, and the like. Part of the composite medium may be detachable.

In the above embodiments, the recording media 200 and 210 are separated from the image processing apparatus 100 and can be arbitrarily connected to it. One or both of the recording media may be fixed to the image processing apparatus 100. The image processing apparatus 100 may be so designed as to allow connecting one or an arbitrary number of recording media 200 or 210. The recording media 200 and 210 are mounted in the image processing apparatus 100, but one or a plurality of recording media may be mounted.

As described above, the embodiments of the present invention can provide the following image processing apparatus and image processing apparatus control method. That is, when the photographer presses the shutter switch by one stroke without any consciousness of SW1 or SW2, the final target range of the autoexposure control means (AE) is widened to decrease the calculation count and shorten the calculation time. Further, the gain of an image signal obtained in actual exposure is corrected in the increasing direction on the basis of the ratio of the luminance level of a photometry value and the luminance level of an image photographed in underexposure in advance. An image can be photographed at a proper exposure level with a short time lag even in the presence of an exposure control value error or mechanical variations of the aperture or shutter.

The object of the present invention is achieved when a storage medium which stores software program codes for realizing the functions of the above-described embodiments is supplied to a system or apparatus, and the computer (or the CPU or MPU) of the system or apparatus reads out and executes the program codes stored in the medium such as a storage medium.

In this case, the program codes read out from the storage medium realize the functions of the above-described embodiments, and the storage medium which stores the program codes constitutes the present invention.

The storage medium for supplying the program codes includes a flexible disk, a hard disk, an optical disk, a magneto-optical disk, a CD-ROM, a CD-R, a magnetic tape, a nonvolatile memory card, and a ROM.

The functions of the above-described embodiments are realized when the computer executes the readout program codes. Also, the functions of the above-described embodiments are realized when an OS (Operating System) or the like running on the computer performs part or all of actual processing on the basis of the instructions of the program codes.

The functions of the above-described embodiments are also realized when the program codes readout from the storage medium are written in the memory of a function expansion board inserted into the computer or the memory of a function expansion unit connected to the computer, and the CPU of the function expansion board or function expansion unit performs part or all of actual processing on the basis of the instructions of the program codes.

As is apparent from the above description, the present invention can provide image information at a proper exposure level by correcting the luminance level of the image signal of a sensed image in response to an instruction input even if the time interval between the start of preparing image sensing processing and the start of image sensing processing is shorter than the exposure control value calculation time.

As many apparently widely different embodiments of the present invention can be made without departing from the spirit and scope thereof, it is to be understood that the invention is not limited to the specific embodiments thereof except as defined in the appended claims.

What is claimed is:

1. An apparatus comprising:
   (A) a first operation unit which designates preparation of photographing;
   (B) a second operation unit which designates start of photographing; and
   (C) a photographing unit which starts exposure preparation operation in response to operation of said first operation unit and starts exposure operation in response to operation of said second operation unit,
   wherein said photographing unit corrects an exposure result after exposure operation when start of exposure operation is designated by operation of said second operation unit before completion of the exposure preparation operation.

2. The apparatus according to claim 1, wherein said first operation unit includes a switch which responds to first-stroke operation of a shutter release member, and said second operation unit includes a switch which responds to second-stroke operation of the shutter release member.

3. The apparatus according to claim 1, wherein said photographing unit calculates an exposure control value as the exposure preparation operation.

4. The apparatus according to claim 1, wherein said photographing unit corrects a luminance level of a sensed image as correction of the exposure result.

5. The apparatus according to claim 1, wherein when start of photographing is designated by said second operation unit before lapse of a predetermined time after preparation of photographing is designated by said first operation unit, said photographing unit determines that start of exposure operation is designated by operation of said second operation unit before completion of the exposure preparation operation.

6. The apparatus according to claim 1, wherein when start of exposure operation is designated by operation of said second operation unit before completion of the exposure preparation operation, said photographing unit starts exposure operation after second exposure preparation operation which is completed within a shorter time than the exposure preparation operation is performed.

7. The apparatus according to claim 1, wherein second exposure preparation operation widens a latitude of an exposure control value.

8. The apparatus according to claim 1, wherein second exposure preparation operation widens a latitude of an exposure control value while limiting an upper limit value to a predetermined range.

9. A photographing method comprising:
   starting exposure control preparation operation in response to operation of a first operation unit, starting exposure operation in response to operation of a second operation unit, and when start of exposure operation is designated by operation of the second operation unit before completion of the exposure control preparation operation, correcting an exposure result after exposure operation.

10. The method according to claim 9, wherein an exposure control value is calculated as the exposure control preparation operation.

11. The method according to claim 9, wherein a luminance level of a sensed image is corrected as correction of the exposure result.

12. The method according to claim 9, wherein when start of photographing is designated by the second operation unit before lapse of a predetermined time after preparation of photographing is designated by the first operation unit, start of exposure operation is determined to be designated by operation of the second operation unit before completion of the exposure control preparation operation.

13. A photographing control computer program comprising:
   starting exposure control preparation operation in response to operation of a first operation unit, starting exposure operation in response to operation of a second operation unit, and when start of exposure operation is designated by operation of the second operation unit before completion of the exposure control preparation operation, correcting an exposure result after exposure operation.

14. The program according to claim 13, wherein an exposure control value is calculated as the exposure control preparation operation.

15. The program according to claim 13, wherein a luminance level of a sensed image is corrected as correction of the exposure result.

16. The program according to claim 14, wherein when start of photographing is designated by the second operation unit before lapse of a predetermined time after preparation of photographing is designated by the first operation unit, start of exposure operation is determined to be designated by operation of the second operation unit before completion of the exposure control preparation operation.

17. A storage medium which stores a photographing control computer program defined in claim 14.

* * * * *